United States Patent [19]
Hutchings

[11] 3,743,969
[45] July 3, 1973

[54] MODULATION SERVO CONTROL FOR FREQUENCY MODULATED RING LASER GYRO
[75] Inventor: Thomas J. Hutchings, Orange, Calif.
[73] Assignee: North American Rockwell Corporation, El Segundo, Calif.
[22] Filed: Nov. 12, 1969
[21] Appl. No.: 882,408

[52] U.S. Cl. ......... 332/7.51, 356/106 RL, 331/94.5
[51] Int. Cl. ........................... H01s 3/00, H01s 3/11
[58] Field of Search ............................ 356/106 RL; 331/94.5

[56] References Cited
UNITED STATES PATENTS
3,537,027  10/1970  Smith ........................... 356/106 LR
3,627,422  12/1971  Chodorow .................... 356/106 LR
3,277,393  10/1966  Nicolai ......................... 356/106 LR
3,277,392  10/1966  Nicolai .......................... 331/94.5
3,373,650  3/1968   Killpatrick ..................... 356/106
3,469,922  9/1969   Coccoli et al. ................. 356/106

OTHER PUBLICATIONS
W. Macek, Electromagnetic Angular Rotation Sensing, 10/13/67, pg. 23–45, by Defense Documentation Center.

Primary Examiner—Samuel Feinberg
Assistant Examiner—N. Moskowitz
Attorney—L. Lee Humphries and H. Fredrick Hamann

[57] ABSTRACT

A ring laser gyro has a pair of counter-rotating beams, the difference frequency between the beams being indicative of the rotational rate to which the instrument is subjected. The beams are frequency modulated to minimize frequency-locking therebetween. A servo control is provided to maintain the modulation index of the frequency modulation to an optimum value for minimal frequency-locking between the beams.

5 Claims, 4 Drawing Figures

INVENTOR
THOMAS J. HUTCHINGS

MODULATION SERVO CONTROL FOR FREQUENCY MODULATED RING LASER GYRO

BACKGROUND OF THE INVENTION

1. Field of the Invention

This invention relates to ring laser gyros, and more particularly to a servo technique for maintaining the modulation index of the frequency modulation of a laser gyro beam to an optimum value for minimal frequency-locking.

2. Description of the Prior Art

In my copending application Ser. No. 637,832, filed May 11, 1967, and now abandoned, a ring laser gyro is described utilizing counter-rotating laser beams which are heterodyned together to provide a difference frequency indicative of the rotation rate to which the instrument is subjected. Further, in my copending application Ser. No. 849,262, filed August 4, 1969, a technique and apparatus are described for the frequency modulation of the laser beams to minimize the effects of frequency-locking therebetween which frequency-locking makes for inaccuracies in the instrument output at low rotation rates. As described in this second application, it is essential that the modulation index of the frequency modulation used be set and maintained at a particular optimum value to achieve the desired end results. While this optimum modulation index can be readily determined and initially set into the instrument, there are many factors such as temperature changes, variations in supply voltage, ambient vibrations and other mechanical disturbances, etc., which would tend to change the modulation index from its initially set optimum value. This is so particularly when utilizing the instrument in typical field operation conditions, such as, for example, would be encountered in a high speed vehicle.

It is therefore necessary to the proper functioning of this instrument that means be provided to precisely maintain the optimum modulation index to the initially set value at all times and under all types of operating conditions. This invention is concerned with providing means for achieving this end result.

OBJECTS OF THE INVENTION

It is therefore the principal object of this invention to provide a servo control for maintaining the modulation index of the frequency modulation of the beams of a ring laser gyro at an optimum predetermined value.

Other objects of this invention will become apparent as the description proceeds in connection with the accompanying drawings, of which:

SUMMARY OF THE INVENTION

Figure 1:
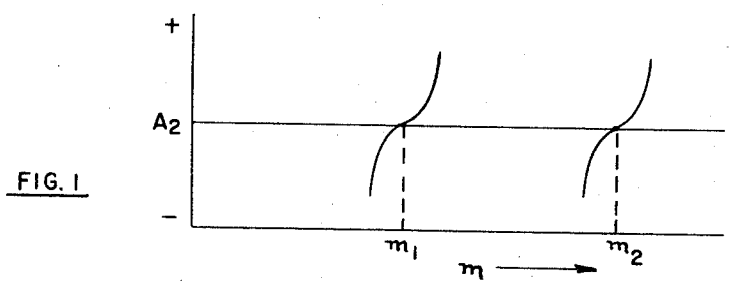
FIG. 1 is a graph illustrating the principles of operation of a first embodiment of the device of the invention.

Briefly described, the method and apparatus of this invention involves the use of the difference frequency output of a laser gyro to generate a servo control signal indicative of any departure from the predetermined optimum modulation index, this control signal being utilized to maintain this optimum modulation index. In one embodiment, this end result is achieved by detecting the second harmonic content of the difference frequency signal, such harmonic content being zero at the optimum modulation index and having opposite phases for indices above and below this optimum point. This detected signal indicative of the modulation index is used to control either the frequency or depth of modulation of the modulating signal so as to minimize the second harmonic content of the output, thereby maintaining the modulation index at its optimum value.

In a second embodiment, a dither signal is utilized to provide a small periodic variation in the modulation index about a mean value. The beat frequency output signal of the gyro is highest when the modulation index is optimum, due to the fact that the effects of frequency-locking are minimal for this index, and falls off for indices both above and below this optimum value. With the modulation index at its peak value, therefore, the small dither signal will produce a minimal variation in the beat frequency. The second embodiment of the invention is implemented by demodulating the dither signal from the beat frequency output of the gyro and comparing this signal with the dither modulation signal in a synchronous detector to generate an "error" signal in accordance with the phasal relationship therebetween. This error signal is then used to control the modulation index to maintain it at its optimum value.

THEORETICAL DISCUSSION

The following theoretical considerations are presented to facilitate an appreciation of the various factors involved in this invention.

In a ring laser gyro, difficulties have been encountered in getting reliable output signals, especially at low rotation rates, due to frequency-locking between the two beams, primarily caused by back-scattering effects. This, for certain rotation rates, will cause the beat difference frequency to go to zero, and results in a nonlinearity in the difference frequency output, over a range of low rotation rates. This non-linearity makes it difficult to obtain useful information from the instrument in the low rotation rate range. The beat frequency output signal, $B_o$, in this non-linear range can be represented as follows:

$$B_o = A_1 \cos\omega t + A_2\cos(2\omega t + \psi_1) \ldots \quad (1)$$

$$\ldots\ldots + A_n\cos(n\omega t + \psi_n)$$

where $\omega$ is a function of the fundamental difference frequency generated, $A_1$, $A_2$, and $A_n$ are the peak amplitudes of the fundamental and various harmonic components of the signal, and $\psi_1$ and $\psi_n$ represent the phase shifts in the various harmonic components.

As can be seen, significant harmonic distortion is present in the output signal. As described in the aforementioned copending application Ser. No. 849,262, if the two beams are frequency modulated with signals having predetermined modulation indices, the frequency locking and along with it the harmonic distortion in the output signal can be minimized and ideally eliminated entirely. As described in this application, these modulation indices are one half of the indices which make the zero order Bessel functions of a frequency modulated wave go to zero (i.e., 1.2, 2.75 and 4.3).

The frequency, $f$, of a frequency modulated signal can be defined as follows:

$$f = f_1 + B_m \cos 2\pi F_b t \qquad (2)$$

wherein $B_m$ is the depth or degree of modulation, $F_b$ is the frequency of the modulating signal, and $f_1$ is the frequency of the unmodulated signal.

The modulation index, m, of an FM signal is defined as follows:

$$m = B_m/F_b \qquad (3)$$

Thus it can be seen that the modulation index, $m$, can be varied by either changing the frequency of the modulation, $F_b$, or the depth of the modulation, $B_m$, which is a function of the amplitude of the modulating signal.

As pointed out in the aforementioned application Ser. No. 849,262, the frequency-locking effects can be minimized by frequency modulating the beams with signals having particular modulation indices as indicated above. However, it should be apparent that the benefits of such frequency modulation will only accrue if the modulation indices thereof are precisely held to the optimum value. With the various above noted considerations in mind, let us now consider the techniques and apparatus of the invention for maintaining the modulation index at an optimum value at all times.

DESCRIPTION OF THE PREFERRED EMBODIMENTS

Referring to FIG. 1, a graph showing the relationship between the amplitude, $A_2$, of the second harmonic of the beat frequency output signal and the modulation index, $m$, of the frequency modulating signal is presented. This second harmonic component is set forth in equation (1) above. As shown in the Figure, this second harmonic component is at zero for optimum modulation indices, $m_1$ and $m_2$, and has a "negative" phase for modulation indices below this value and a "positive" phase for modulation indices above this value.

Figure 2:
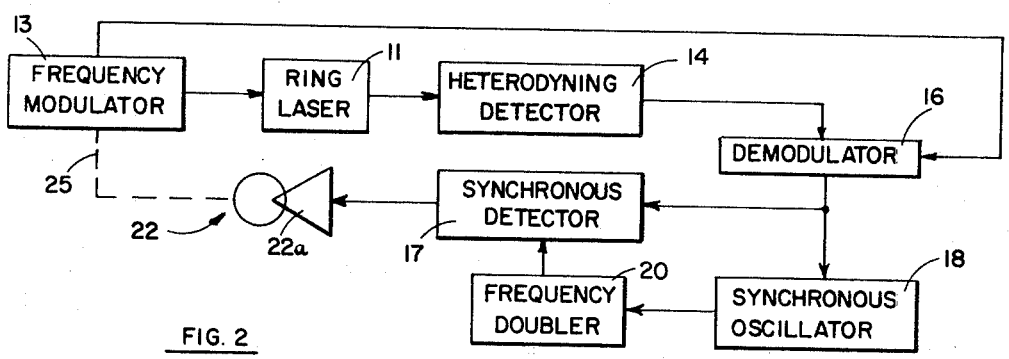
FIG. 2 is a block diagram illustrating the servo system of the first embodiment.

Referring now to FIG. 2, the first embodiment of the invention is illustrated wherein the modulation index is optimized by detecting the second harmonic content of the beat frequency output and servoing the modulation index so as to minimize the second harmonic content. Ring laser 11, which may be of the type described in the aforementioned copending patent applications, has each of its counter-rotating beams frequency modulated by signals emanating from frequency modulator 13. Frequency modulator 13 may be of the type described in the aforementioned patent application Ser. No. 849,262 and is initially manually adjusted to provide an optimum modulation index for minimum frequency-locking. The difference frequency between the two counter-rotating beams of the ring laser, which is indicative of the rotation rate to which the laser is being subjected, is detected by means of heterodyning detector 14 which may comprise a photosensitive surface to which the optical beams are directed and optically heterodyned to produce a difference frequency signal.

The heterodyne signal must then be demodulated so as to obtain the carrier thereof. This is because the signal is of the general form of that given in Equation (2) where the signal of interest is $f_1$. Hence a demodulation with respect to the initial modulation signals must be done to remove the modulation terms and result in the carrier. This demodulation is accomplished by means of demodulator 16 which receives the output of detector 14. Demodulator 16 may comprise a box-car integrator. This device is basically a switch that is closed for a short predetermined time, once for each cycle of the modulation frequency, this switch being operated in response to modulator 13. The signal that passes through this switch goes to an integrator. Hence this unit performs a sampling of the electrical signal once every time the modulation term has gone through one full cycle. This results in looking at the carrier phase changes only, once every cycle of the modulation frequency. The output of the integrator is just the integral of the signal of interest. This carrier is of the general form given by Equation (1). The output of this demodulator is fed as an input to synchronous detector 17. This signal is also used to synchronize a sine wave oscillator 18 which is synchronously operated in response to the fundamental of the output of the heterodyning detector, i.e., at the difference frequency between the two laser beams. The output of oscillator 18 is fed to frequency doubler 20, which provides a sine wave output at the second harmonic of the fundamental beat frequency signal.

This second harmonic signal is fed to synchronous detector 17 as a reference signal therefor. Synchronous detector 17 may be a phase detector having an output as indicated in FIG. 1, i.e., when the input signal thereto is zero a zero output is produced, while in-phase and out-of-phase relationships between the reference and input signals will provide opposite polarity DC signals respectively. The output of synchronous detector 17 is fed to the amplifier portion 22a of servomotor 22, which provides a mechanical drive 25 to control the modulation index of the modulating signals emanating from frequency modulator 13. As already noted, modulation index can be controlled by either changing the modulation frequency or the magnitude of the modulating signal. Thus, mechanical linkage 25 may be either connected to a mechanical control for the frequency or that for the amplitude of the modulating signal.

Thus, in the first embodiment, the modulation index is controlled in accordance with the second harmonic distortion in the output signal to minimize such distortion and thereby the effects of frequency-locking.

The method of introducing the modulation into the ring laser itself is not important and could be achieved by any one of several techniques known in the state-of-the-art. These could include but are not limited to: mechanical rotation of the whole ring or of the mirrors, Faraday bias cells, DC current dithering techniques, or retroflection biasing techniques.

Figure 3:
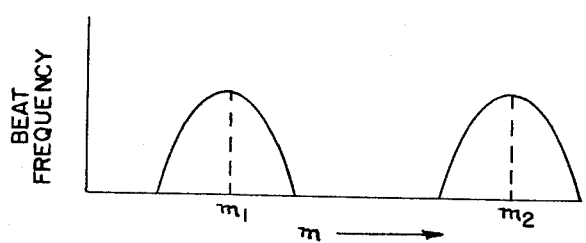
FIG. 3 is a graph illustrating the operation of a second embodiment of the invention.

Referring now to FIG. 3, a graph illustrating the relationship between modulation index and the beat frequency output signal developed between the two beams is shown. As can be seen, the highest or peak frequency is obtained for optimum modulation indices, $m_1$ and $m_2$. This is because with such optimum modulation indices, the effects of frequency-locking are minimized and the full difference frequency between the two beams is realized. It is further to be noted that the frequency of the beat signal falls off on either side of the optimum modulation index in a nearly symmetrical fashion with a positive slope for modulation indices below the optimum value, a negative slope for indices above the optimum value, and zero slope at the optimum value. These factors are used in the second embodiment of the device of the invention by periodically varying the modulation index with a dither signal and utilizing the dither component demodulated from the beat frequency signal to provide servo control for the modulation index.

Figure 4:
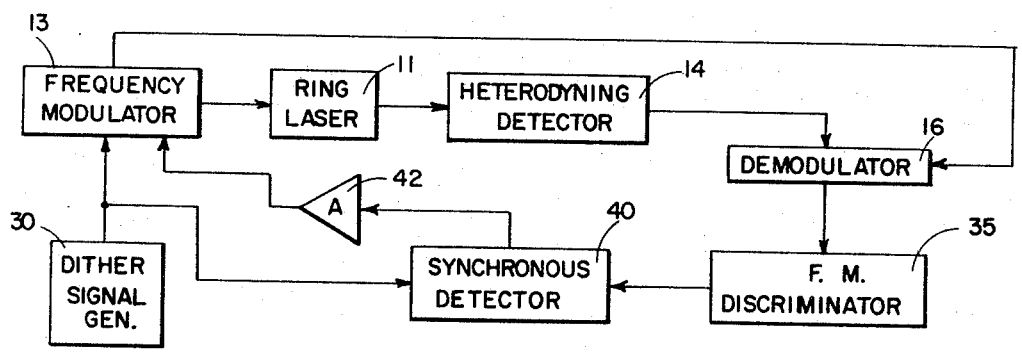
FIG. 4 is a block diagram illustrating this second embodiment.

Referring now to FIG. 4, the implementation of the second embodiment of the device of the invention is illustrated. Frequency modulator 13 operates to modulate the counter-rotating beams of ring laser 11, and the difference frequency between the two beams is detected by means of heterodyning detector 14 in the same manner as described in connection with the first embodiment. In this second embodiment, however, an AC dither signal is fed from dither signal generator 30 to the frequency modulator. This low amplitude AC signal is introduced into the frequency control circuitry of the modulator so as to vary the frequency of the modulation signal in accordance therewith, or alternatively in the amplitude control to vary the amplitude thereof. Thus, the modulation index, $m$, of the frequency modulation signals are cyclically varied (see equation 3). The beat frequency output signal from heterodyning detector 14 is fed to demodulator 16, which may be the same type of demodulator as used for the first embodiment, which operates with reference to the frequency modulator to demodulate the heterodyne signal as explained previously. This demodulated signal is fed as an input to FM discriminator 35. This discriminator is tuned to the dither frequency so that it effectively detects any frequency variation in the beat signal at this frequency. With the modulation index at any of its optimum values ($m_1$, $m_2$), we are operating at the peak of the curve shown in FIG. 3, and with the zero slope at this peak there is no variation in the beat frequency in response to the dither. When operating below the optimum modulation index, operation is on the positive slope of the curve, while operating above this optimum modulation index results in operation on the negative slope of the curve. FM discriminator 35 has an output signal to synchronous detector 40 accordingly. Thus, a zero output is produced with the modulation index at its optimum value, while signals with a "positive" phase are produced when operating below the optimum value and signals with a "negative" phase are produced when operating above the optimum value.

Synchronous detector 40 receives a reference signal from dither signal generator 30 which is phase compared with the output of discriminator 35. Thus detector 40 has no output when the output of the discriminator is zero, a positive output when the modulation index is below the optimum value, and a negative output when it is above this value. Synchronous detector 40 may be a phase detector having a DC output as indicated above. The output of synchronous detector 40 is amplified in amplifier 42 and fed as a control signal to frequency modulator 13, this control signal being utilized to control either the amplitude or the frequency of the output of modulator 13. If so desired, a servomotor may be utilized as shown in the embodiment of FIG. 2; or an electronic control technique such as using the control signal as a bias for setting the amplitude of the modulation signal may be used. Thus, the device of FIG. 4 servos the frequency modulator to maintain an optimum modulation index at all times.

I claim:

1. A method for automatically maintaining the modulation index of the frequency modulation of the counter-rotating laser beams of a laser gyro at a predetermined optimum value comprising the steps of:

heterodyning said beams together to generate a beat difference frequency signal;

deriving an error signal from said difference frequency signal in accordance with the departure of said modulation inde from said optimum value; and controlling the modulation index of said counter-rotating beams with said error signal so as to minimize said error signal by changing the frequency of said beams or by changing the modulation amplitude of said beams in accordance with the equation $m = B/F$, where m is the modulation amplitude, B is the depth of modulation and F is the frequency of the modulating signal.

2. The method of claim 1 wherein said error signal is derived by using a dither signal to periodically vary the modulation index of said frequency modulation, demodulating said dither signal from the difference frequency signal, comparing said demodulated dither signal with the dither signal used to vary the modulation index and generating said error signal as a function of the relationship therebetween.

3. In a ring laser gyro including a pair of counter-rotating laser beams and means for frequency modulating said beams with a modulation signal having a modulation index of a predetermined optimum value, means for maintaining said index at said optimum valve, comprising:

means for generating a beat difference frequency signal between said beams;

means for detecting a preselected harmonic distortion component in said difference frequency signal and generating an error signal in accordance therewith; and servo means responsive to said error signal for controlling the modulation index of said counterrotating beams so as to minimize the distortion component, and for changing the modulation amplitude of said beams in accordance with the equation $m = B/F$, where $m$ is the modulation amplitude, $B$ is the depth of modulation and $F$ is the frequency of the modulating signal, or for changing the frequency of said beams.

4. A method for automatically maintaining the modulation index of the frequency modulation of the counter-rotating laser beams of a laser gyroscope at a predetermined optimum value comprising the steps of:

heterodyning said beams together to generate a beat difference frequency signal; and deriving an error signal from said difference frequency signal by detecting the second harmonic of said difference frequency signal by synchronizing a sine wave oscillator with said difference frequency signal, doubling the frequency of said oscillator output and synchronously detecting the second harmonic component of said difference frequency signal by using the double frequency signal as a reference, said error signal being used to adjust the modulation index so as to minimize said second harmonic of said difference frequency signal.

5. In a ring laser gyroscope including a pair of laser beams and means for frequency modulating said beams with a modulation signal having a modulation index of a predetermined optimum value, means for maintaining said index at said optimum value comprising:

means for generating a beat difference frequency signal between said beams;

means for detecting the second harmonic of said difference frequency signal and generating an error signal comprising synchronized oscillator means for generating a sine wave at the difference frequency in response to the difference frequency signal, frequency doubler means for doubling the frequency of the output of said synchronized oscillator means and synchronous detector means for receiving the output of said doubler means and the beat difference signal and generating an error signal in accordance with the phase relationship therebetween; and servo means responsive to said error signal for controlling the modulation index so as to minimize the distortion component.

\* \* \* \* \*